United States Patent [19]

Tate

[11] 4,009,348
[45] Feb. 22, 1977

[54] FAULT BYPASS FOR A PROCESSOR ASSOCIATED SCANNER

[75] Inventor: Michael Bernard Tate, Chelmsford, England

[73] Assignee: The Marconi Company Limited, Chelmsford, England

[22] Filed: June 2, 1975

[21] Appl. No.: 582,976

[30] Foreign Application Priority Data

June 21, 1974 United Kingdom ............ 27532/74

[52] U.S. Cl. ...................... 179/15 BF; 179/18 FG
[51] Int. Cl.[2] ......................................... H04M 3/12
[58] Field of Search ...... 179/18 FG, 15 BF, 15 AT, 179/15 BY, 18 FF; 340/4 B, 415; 307/243

[56] References Cited

UNITED STATES PATENTS

| 3,493,683 | 2/1970 | Schlichte | 179/18 FG |
| 3,760,113 | 9/1973 | Bouchet | 179/18 FG |
| 3,770,899 | 11/1963 | Kobus | 179/18 FG |
| 3,787,635 | 1/1974 | Kammerl | 179/15 BF |
| 3,821,479 | 6/1974 | Campbell | 179/15 BF |

Primary Examiner—David L. Stewart
Attorney, Agent, or Firm—Baldwin, Wight & Brown

[57] ABSTRACT

A processor equipment has an input highway connected to receive a multiplex signal from a number of peripheral devices such as multiplex units time division multiplxing telephone handsets. A counter is arranged to scan the devices for a processor interrupt signal and upon the occurrence of such a signal the counter is inhibited to enable the processor to take the appropriate action for the interrupting device, e.g. apply a dial tone. If one of the peripheral devices becomes faulty a store memorizes the fact that on a previous scan the device produced a non-valid interrupt signal and causes the address of a predetermined other peripheral device to be written into the counter at which scanning is to recommence.

5 Claims, 1 Drawing Figure

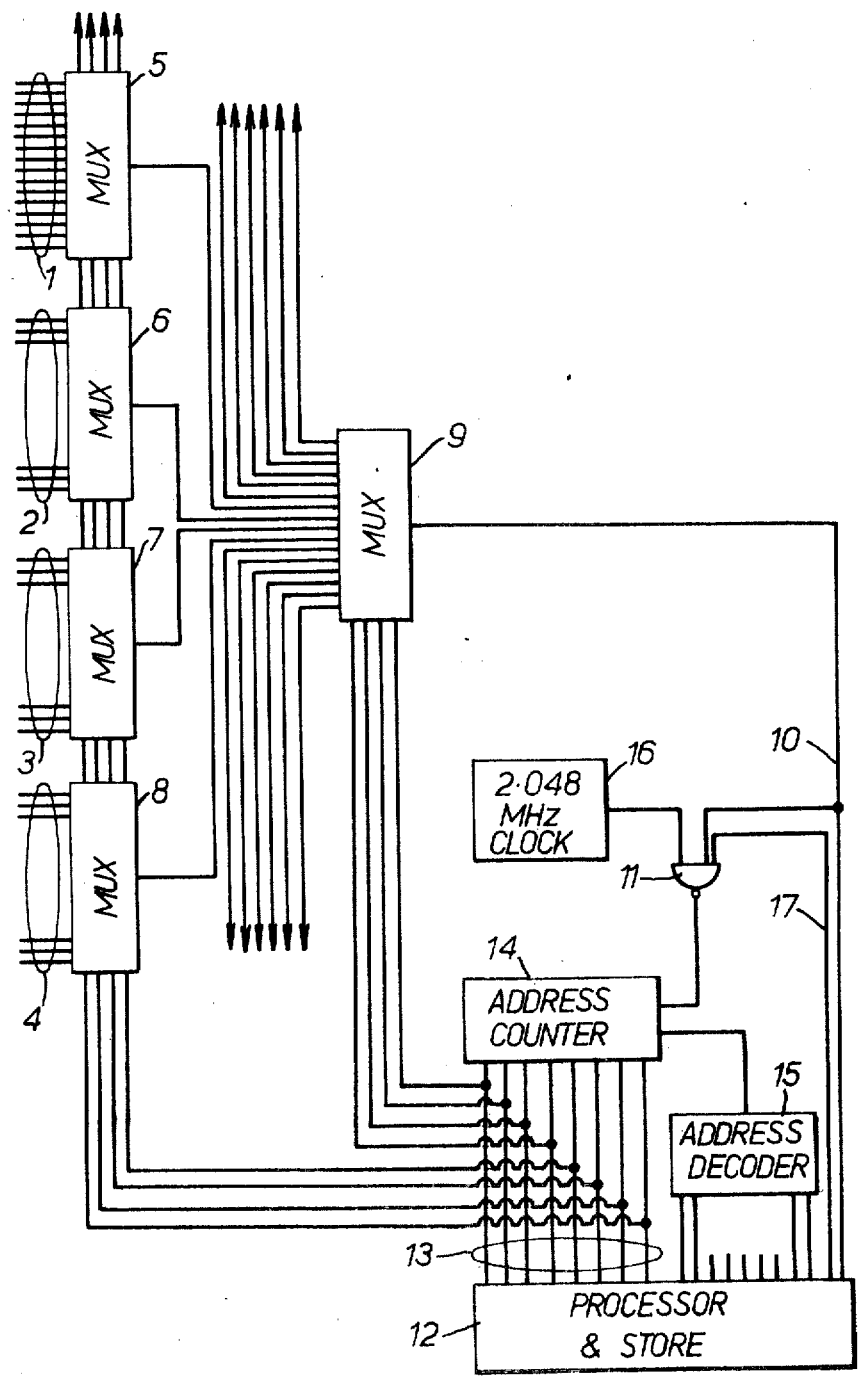

FAULT BYPASS FOR A PROCESSOR ASSOCIATED SCANNER

This invention relates to processor equipments and more particularly to an equipment having an input which is arranged to receive multiplexed signals from a plurality of peripheral devices.

In one application of such a processor equipment a plurality of telephone handsets are time division multiplexed on a common highway to the equipment, which equipment is arranged to scan each of the handsets for an interrupt signal. Upon detection of the interrupt signal the processor of the equipment takes the appropriate action, which may be, for example, to apply a dial tone to the interrupting device. In dependence upon the mode of scanning employed by the equipment, upon initiation of the appropriate action the equipment recommences scanning for further interrupt signals. Thus where the equipment is operating in a priority mode scan after detection of an interrupt signal the equipment recommences scanning from the highest priority device, whereas if the equipment is operating in a sequential mode of scan the equipment recommences scanning at the next following lower priority device. Where a large number of handsets are controlled by the processor equipment a plurality of multiplex units are provided which each multiplex a plurality of handsets. If a fault condition arises in one of the handsets or multiplex units such that a permanent interrupt signal is present and the equipment is operating in the priority mode scan then lower priority handsets or multiplex units being multiplexed will not be scanned since the equipment will always be returned to scan the handset having the highest priority in the highest order priority multiplex unit.

The present invention seeks to provide a processor equipment in which the foregoing difficulty is reduced.

According to this invention a processor equipment having an input arranged to receive a multiplexed signal from a plurality of peripheral devices comprises a processor with input and output highways to an address counter which is driven by a clock means to scan the devices for a processor interrupt signal, means for detecting an interrupt signal to stop the counter from scanning said devices and to enable the processor to take the appropriate action for the interrupting device, and store means for memorising the presence of a faulty interrupting device such that during the next following scan if the faulty device again produces an interrupt signal the processor disregards interrupt signals from said faulty device and provides the counter with the address of any device not having a fault at which scanning is to recommence.

The peripheral devices may be multiplex units, telephone handsets and/or any device operated under the control of a processor.

Preferably when a device interrupts the processor the clock means is disabled so that the address of the interrupting device is staticised by the counter until the processor has taken the appropriate action for that device and the address of the device at which scanning is to recommence has been written into the counter.

The invention will now be described, by way of example, with reference to the accompanying drawing which shows in block schematic form a processor equipment in accordance with this invention.

The processor equipment shown in the drawing is intended to cater for 256 telephone handsets in groups of 16, only four groups 1, 2, 3, 4 being shown for clarity. The individual inputs of each group are time division multiplexed by multiplex units 5, 6, 7, 8 and applied to a further multiplex unit 9 where the group interrupt signals are multiplexed prior to being transmitted on a processor interrupt line 10. The multiplex units 5 – 9 may be Texas Instruments type number SN 74150. The line 10 is connected to a NAND gate 11 (Texas Instruments type number SN 7410) and a processor and store unit 12 based on the Intel 8080 microprocessor, the unit 12 having eight input and output highways 13 connected to an address counter 14. The counter 14 may be formed from the combination of Texas Instruments type numbers SN 74163 and SN 74368. The four lowest priority highways are also connected to the units 5, 6, 7, 8 and the four highest priority highways are further connected to the unit 9. An address decoder 15, formed from the combination of Texas Instrument type numbers 7409 and 7410, is provided as an interface between the unit 12 and counter 14, the counter being driven by a 2.048 MHz crystal controlled clock 16 through the gate 11. The clock 16 comprises a suitable crystal oscillator whose output is shaped by a squaring circuit device such as Texas Instruments type number 7404. An interrupt enable connection 17 is provided between the gate 11 and the unit 12.

In operation, when none of the handsets are producing an interrupt signal the gate 11 is enabled to permit the clock 16 to drive the counter 14 so that each handset is scanned and its state multiplexed with other handsets in its associated group 1, 2, 3 or 4 by units 5, 6, 7 or 8, the scanning and multiplexing being performed by a 4-bit control code over the four lowest priority highways of highways 13. The input signals to unit 9 are further multiplexed onto the processor interrupt line 10 as selected by another 4-bit control code from the four highest priority highways of highways 13, the two 4-bit control codes together forming the address of the handset whose interrupt state is to be applied to the line 10.

When a handset requires a data transfer it sets an associated flip-flop (not shown) which puts a permanent signal on its associated input in the group 1, 2, 3 or 4 and which, after multiplexing appears on the processor interrupt line 10 to disable gate 11 and inhibit the counter 14 such that the address of the interrupting device is staticised by the counter 14. The interrupt signal is also applied to the processor and store unit 12 which inverts the state of the interrupt enable line 17 to ensure that the gate 11 is disabled irrespective of whether the state of line 10 changes, and reads the address of the interrupting handset out of the counter 14 which it stores. The data transfer required by the handset, which may be for example, to apply a dial tone, is executed under software control by the unit 12 and when complete the flip-flop associated with the handset is reset by software control. When the flip-flop resets, the interrupt signal is thus removed from the line 10 but the counter 14 is still inhibited by the signal on line 17. The unit 12 decides which new address is to be written into the counter 14, that is from which handset scanning is to recommence. Thus if sequential mode scanning is required then the address of the interrupting handset +1 is written into the counter and if priority mode scanning is required the address of the highest priority handset is written into the counter. It is only after a new address has been written into the counter 14 that the state of line 17 is altered to enable gate 11 so that the counter 14 is again driven by the clock 16.

Consider the situation if multiplex unit 6 becomes faulty such that all of the handset lines associated with group 2 appear to produce interrupt signals and the equipment is working in priority mode scanning. The first time the lines of group 2 are scanned the unit 12 memorises the fact that the lines associated with unit 6 produced an incorrect interrupt signal after interrogating all the handsets associated with group 2 in turn and finding that none required a data transfer. During the next following scans if the highest priority handset of unit 6 produces an interrupt signal the store of the unit 12, having memorised a fault condition in the previous scan or scans, causes the address of the next lower priority handset not having a fault to be written into the counter 14, i.e. the address of the highest priority handset associated with unit 7. It will be remembered that in a non-faulty condition the flip-flop associated with an interrupting device is reset after appropriate action is taken so that the interrupt signal on line 10 is removed. However in a fault condition the state of line 10 remains with an interrupt signal thereon although the state of line 17 alters when a different address is written into the counter 14 by the unit 12. The state of line 10 will, therefore, change only when the address of a noninterrupting and non-faulty device is written into the counter 14 by the unit 12. Thus in this manner, even though the equipment was working in priority mode all valid handset interrupt signals are detected even in the presence of faults.

I claim:

1. A processor equipment comprising a processor for receiving information from multiplexing means connected to a plurality of peripheral devices, an address counter for controlling said multiplexer means to scan the peripheral devices for processor interrupt signals, a clock generator controlling said address counter, and address lines connecting said address counter to said multiplexing means and said processor enabling the processor to receive the count contained in said counter and to modify said count, the improvement wherein a gate circuit is provided with one clock and two blocking inputs and the clock input of the gate circuit is connected to the clock generator and its output is connected to the address counter, the output of said multiplexing means is connected both with the processor and with the first blocking input of the gate circuit, the processor has a memory unit which stores the address of an interrupting peripheral device from the address counter, and the second blocking input is connected from the processor for inhibiting the gate circuit following an interrupt signal until the next valid address is written into the address counter by the processor.

2. A processor equipment as claimed in claim 1 wherein the peripheral devices are multiplex units.

3. A processor equipment as claimed in claim 1 wherein the peripheral devices are telephone handsets.

4. In a processing system having an input arranged to receive a multiplexed signal from a plurality of peripheral devices, said system including an address counter, a processor having input and output highways connected to the address counter, and a clock means for driving said counter, the method of repeatedly interrogating the peripheral devices for interrupt signals which comprises the steps of:
   a. applying said multiplexed signal simultaneously to said clock means and said processor respectively to provide a first signal blocking said clock means and to produce a second signal from said processor which blocks said clock means in response to an interrupt signal, whereby said address counter is staticised at that current address corresponding to that peripheral device providing said interrupt signal;
   b. causing said processor to act upon that peripheral device which produced said interrupt signal whereby, in the absence of a fault, said interrupt signal which provides said first blocking signal is removed;
   c. storing said current address in said processor in the event that said first blocking signal is not removed in step (b); and
   d. then writing a new address into said address counter from said processor, which new address is not one previously stored in said processor as in step (c), whereby both said first blocking signal and said second blocking signal are removed to allow further counting by said address counter from said new address.

5. In the method as defined in claim 4 wherein said peripheral devices are arranged in groups, and wherein the new address written in step (c) is the address in a second group when all peripheral devices belonging to a first group to which said device producing the interrupt signal of step (a) belongs indicate faults as in step (c).

* * * * *